United States Patent
Takahashi et al.

(10) Patent No.: US 10,914,614 B2
(45) Date of Patent: Feb. 9, 2021

(54) ENCODER APPARATUS AND METHOD FOR CALCULATING ECCENTRICITY INFORMATION BASED ON A PHASE DIFFERENCE BETWEEN AN INCREMENTAL DETECTION SIGNAL AND AN ABSOLUTE DETECTION SIGNAL USED TO CORRECT ROTATIONAL INFORMATION

(71) Applicant: NIKON CORPORATION, Tokyo (JP)

(72) Inventors: Taiyo Takahashi, Tokyo (JP); Akihiro Watanabe, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 78 days.

(21) Appl. No.: 15/745,653

(22) PCT Filed: Jul. 15, 2016

(86) PCT No.: PCT/JP2016/071006
§ 371 (c)(1),
(2) Date: Mar. 29, 2018

(87) PCT Pub. No.: WO2017/014189
PCT Pub. Date: Jan. 26, 2017

(65) Prior Publication Data
US 2018/0245952 A1    Aug. 30, 2018

(30) Foreign Application Priority Data

Jul. 17, 2015  (JP) ................ 2015-142971

(51) Int. Cl.
*G01D 5/347*    (2006.01)
*G01D 5/244*    (2006.01)
*B25J 18/00*    (2006.01)

(52) U.S. Cl.
CPC ............ *G01D 5/3473* (2013.01); *B25J 18/00* (2013.01); *G01D 5/24471* (2013.01);
(Continued)

(58) Field of Classification Search
CPC ...... G01D 5/3473; G01D 5/244; G01D 5/347; G01D 5/34707; G01D 5/24452;
(Continued)

(56) References Cited

U.S. PATENT DOCUMENTS

2011/0147572 A1   6/2011   Nakamura
2011/0303831 A1   12/2011  Nagura
(Continued)

FOREIGN PATENT DOCUMENTS

JP   H07-134045 A    5/1995
JP   2002-250640 A   9/2002
(Continued)

OTHER PUBLICATIONS

Oct. 11, 2016 International Search Report issued in International Patent Application No. PCT/JP2016/071006.
(Continued)

*Primary Examiner* — Jennifer D Bennett
(74) *Attorney, Agent, or Firm* — Oliff PLC

(57) ABSTRACT

Provided is an encoder apparatus including: a scale provided to a rotation shaft of a drive apparatus and having a predetermined pattern; a detector that detects the predetermined pattern; a rotation information calculator that calculates rotation information on the rotation shaft by using detection results of the detector; an eccentricity information calculator; and a corrector that corrects the rotation information.

24 Claims, 19 Drawing Sheets

(52) U.S. Cl.
CPC ......... *G01D 5/347* (2013.01); *G01D 5/34784* (2013.01); *Y10S 901/23* (2013.01)

(58) Field of Classification Search
CPC . G01D 5/24471; G01D 5/34784; B25J 18/00; B25J 19/021; Y10S 901/23
See application file for complete search history.

(56) References Cited

U.S. PATENT DOCUMENTS

| | | | |
|---|---|---|---|
| 2014/0277730 A1* | 9/2014 | Nakamura | B25J 13/088 700/258 |
| 2015/0354992 A1* | 12/2015 | Murokita | G01D 5/34715 318/640 |
| 2016/0146630 A1 | 5/2016 | Takahashi et al. | |

FOREIGN PATENT DOCUMENTS

| | | |
|---|---|---|
| JP | 2004-318439 A | 11/2004 |
| JP | 2012-002592 A | 1/2012 |
| JP | 2015-105829 A | 6/2015 |
| WO | 2011/074103 A1 | 6/2011 |
| WO | 2015/008622 A1 | 1/2015 |

OTHER PUBLICATIONS

Oct. 11, 2016 Written Opinion issued in International Patent Application No. PCT/JP2016/071006.
Oct. 29, 2019 Office Action issued in Japanese Patent Application No. 2017-529880.
Jul. 3, 2019 Chinese Office Action issued in Chinese Patent Application No. 201680041728.6.
Feb. 12, 2019 Japanese Office Action issued in Japanese Patent Application No. 2017-529880.
Jul. 12, 2018 Japanese Office Action issued in Japanese Patent Application No. 2017-529880.
Jun. 19, 2020 Office Action issued in Chinese Patent Application No. 201680041728.6.

* cited by examiner

ENCODER APPARATUS AND METHOD FOR CALCULATING ECCENTRICITY INFORMATION BASED ON A PHASE DIFFERENCE BETWEEN AN INCREMENTAL DETECTION SIGNAL AND AN ABSOLUTE DETECTION SIGNAL USED TO CORRECT ROTATIONAL INFORMATION

FIELD OF THE INVENTION

The present invention relates to an encoder apparatus, a drive apparatus, a stage apparatus, a robot apparatus, a rotation information acquisition method, and a rotation information acquisition program.

BACKGROUND

Encoder apparatuses to detect rotation information are mounted on various kinds of apparatuses such as drive apparatuses (for example, motor apparatuses) (see, for example, Patent Literature 1 below). For example, the encoder apparatuses detect light from a scale provided to a rotation shaft, and acquire rotation information.

CITATION LIST

Patent Literature

[Patent Literature 1] Japanese Patent Application Publication No, 2004-318439

SUMMARY

According to a first aspect of the present invention, there is provided an encoder apparatus, including: a scale that has a first pattern and a second pattern; a detector with a relative position with respect to the first pattern and a relative position with respect to the second pattern changed by rotation of a rotation shaft to detect the first pattern and the second pattern; a rotation information calculator that calculates rotation information by using detection results of the detector; a storage that stores therein eccentricity information between the rotation shaft and the scale; and a corrector that corrects the rotation information based on the eccentricity information output from the storage and the detection results. The storage stores therein eccentricity information on the scale calculated based on a phase difference between a signal corresponding to a first detection result obtained when the detector detects the first pattern and a signal corresponding to a second detection result obtained when the detector detects the second pattern.

According to a second aspect of the present invention, there is provided an encoder apparatus, including: a scale that has a first pattern and a second pattern; a detector with a relative position with respect to the first pattern and a relative position with respect to the second pattern changed by rotation of a rotation shaft to detect the first pattern and the second pattern; a rotation information calculator that calculates rotation information on the rotation shaft by using detection results of the detector; an eccentricity information calculator that calculates eccentricity information between the rotation shaft and the scale based on a phase difference between a signal corresponding to a first detection result obtained when the detector detects the first pattern and a signal corresponding to a second detection result obtained when the detector detects the second pattern; and a corrector that corrects rotation information based on the eccentricity information and the detection results.

According to a third aspect of the present invention, there is provided a drive apparatus, including: the encoder apparatus according to the first or second aspect; a driver that supplies drive power to the rotation shaft; and a controller that controls the driver by using rotation information corrected by the corrector.

According to a fourth aspect of the present invention, there is provided a stage apparatus, including: a moving object; and the drive apparatus according to the third aspect that moves the moving object.

According to a fifth aspect of the present invention, there is provided a robot apparatus, including: the drive apparatus according to the third aspect; and an arm that moves by the drive apparatus.

According to a sixth aspect of the present invention, there is provided a storage medium storing therein a rotation information acquisition method for acquiring rotation information on a rotation shaft by using an encoder apparatus including: a scale that has a first pattern and a second pattern; and a detector with a relative position with respect to the first pattern and a relative position with respect to the second pattern changed by rotation of the rotation shaft to detect the first pattern and the second pattern, the rotation information acquisition method including: detecting, by the detector, the first pattern and the second pattern; calculating rotation information on the rotation shaft by using detection results of the detector; calculating eccentricity information between the rotation shaft and the scale based on a phase difference between a signal corresponding to a first detection result obtained when the detector detects the first pattern and a signal corresponding to a second detection result obtained when the detector detects the second pattern; and correcting the rotation information based on the eccentricity information and the detection results.

According to a seventh aspect of the present invention, there is provided a rotation information acquisition program for acquiring rotation information on a rotation shaft by using an encoder apparatus including: a scale that has a first pattern and a second pattern; and a detector with a relative position with respect to the first pattern and a relative position with respect to the second pattern changed by rotation of the rotation shaft to detect the first pattern and the second pattern, the rotation information acquisition program causing a computer to execute: calculating rotation information on the rotation shaft by using detection results obtained when the detector detects the first pattern and the second pattern; calculating eccentricity information between the rotation shaft and the scale based on a phase difference between a signal corresponding to a first detection result obtained when the detector detects the first pattern and a signal corresponding to a second detection result obtained when the detector detects the second pattern; and correcting the rotation information based on the eccentricity information and the detection results.

DETAILED DESCRIPTION OF EMBODIMENTS

First Embodiment

Figure 1:
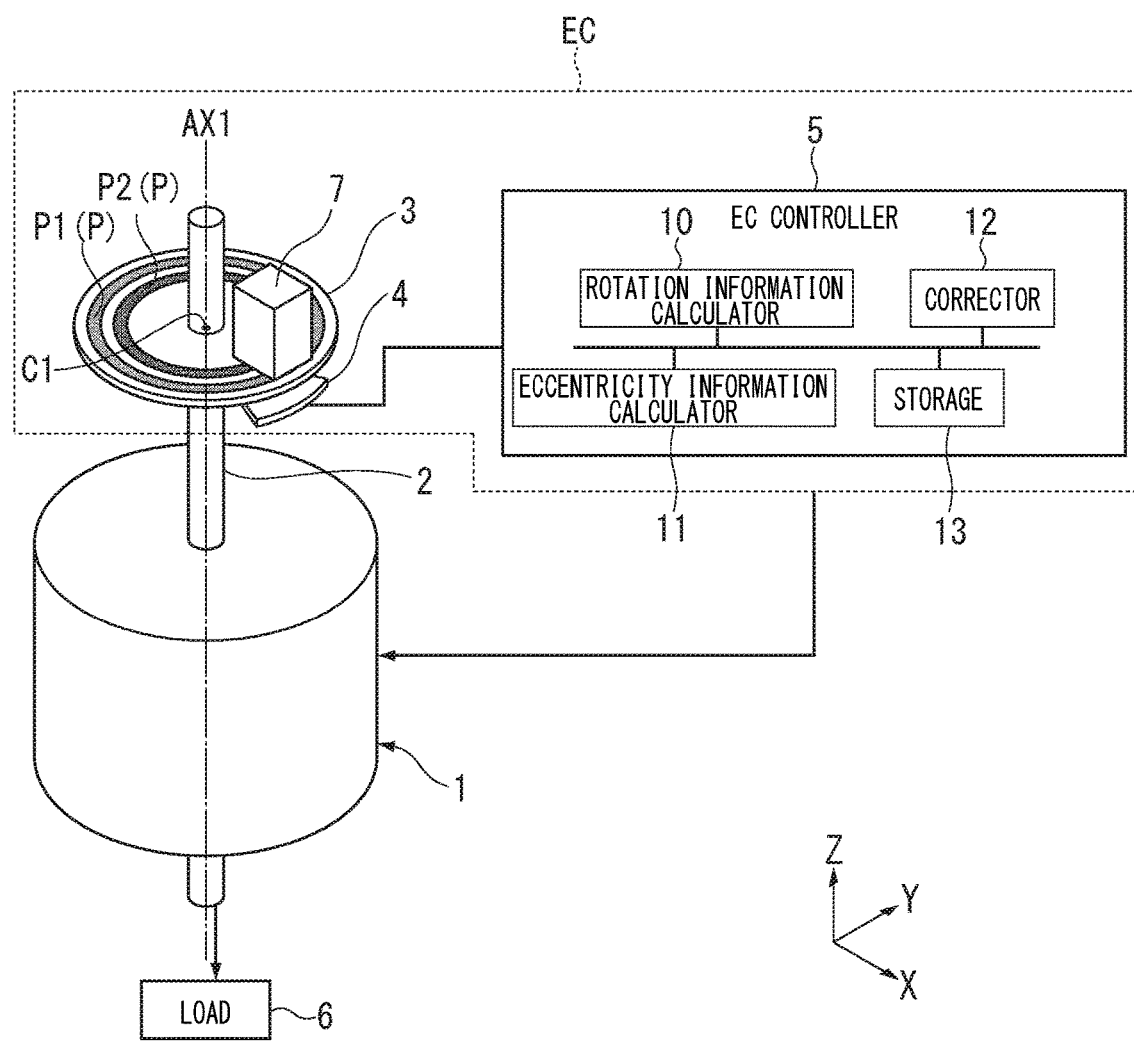
FIG. 1 is a diagram illustrating an example of an encoder apparatus according to the present embodiment.

Embodiments of the present invention are described below with reference to the drawings. Note that the present invention is not limited to the embodiments. In the drawings, the scale is changed as appropriate by partially enlarging or emphasizing the illustration. Directions are described by appropriately using an XYZ coordinate system illustrated in the figures referred to below. Each of the X direction, the Y direction, and the Z direction is a +direction (for example, +X direction) in the direction indicated by arrows in the figures and is a −direction (−X direction) in the opposite direction as appropriate.

A first embodiment is described. FIG. 1 is a diagram illustrating an example of an encoder apparatus EC according to the first embodiment. The encoder apparatus EC corrects rotation information on a rotation shaft 2 of a driver 1 with eccentricity information between the rotation shaft 2 and a scale 3. The encoder apparatus EC includes the scale 3, a detector 4, and an EC controller 5.

Figure 11:
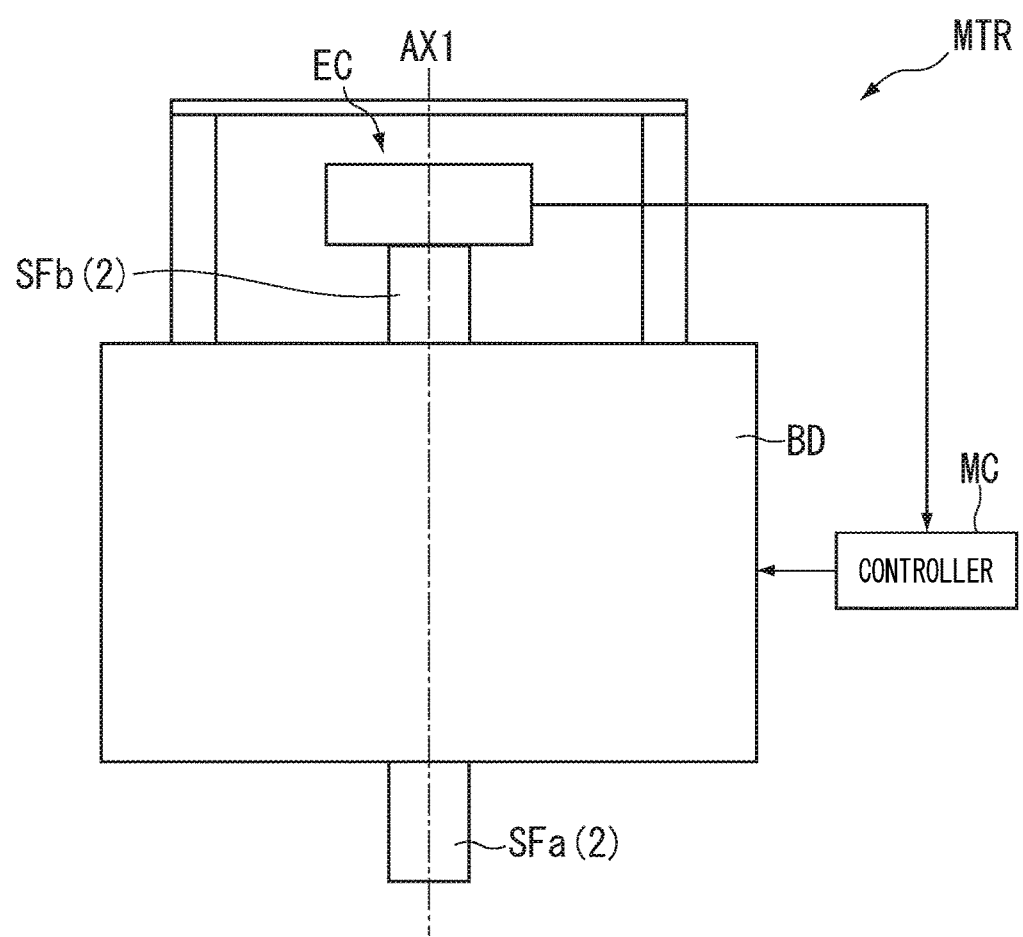
FIG. 11 is a diagram illustrating an example of a drive apparatus.

For example, the driver 1 is a part of a drive apparatus MTP illustrated in FIG. 11 referred to later. The driver 1 rotationally drives the rotation shaft 2. For example, the driver 1 is an electric motor, but is not necessarily required to be an electric motor. The driver 1 only needs to rotate the rotation shaft by using hydraulic pressure or pneumatic pressure. For example, the rotation shaft 2 extends in each of the +Z direction and the −Z direction from the driver 1, and rotates about an axis AX1 (rotation center axis) parallel to the Z direction in response to driving power (torque) of the driver 1. The rotation shaft 2 is a shaft (rotor) of the driver 1, but may be a shaft connected to the shaft of the driver 1. The rotation shaft 2 may be a shaft in a power transmitter such as a gearbox connected to the shaft of the driver 1. The rotation shaft 2 may be a shaft connected to the shaft of the driver 1 through a power transmitter. The rotation shaft 2 may be a shaft connected to the load 6.

For example, the scale 3 is connected to the rotation shaft 2 of the driver 1, and has a predetermined pattern P. For example, the scale 3 is provided on the side opposite to the side where the rotation shaft 2 is connected to a load 6 (anti-output shaft side). In the case where the scale 3 is provided on the anti-output shaft side, contamination (for example, oil) from the load 6 is prevented from adhering to the scale 3. For example, the scale 3 is a disc-shaped member, and its top surface in the +Z direction and its bottom surface in the −Z direction are parallel to the XY plane. The scale 3 is disposed so as to be vertical to the rotation shaft 2 (parallel to XY plane) and such that the axis AX1 (rotation center axis of rotation shaft 2) passes through a center C1 of the scale 3. Here, the scale 3 is of a transmission type in which light transmitted through the scale 3 is used to acquire rotation information, but may be of a reflection type in which light reflected by the scale 3 is used to acquire rotation information.

For example, the predetermined pattern P of the scale 3 includes an incremental pattern P1 (second pattern) and an absolute pattern P2 (first pattern). The incremental pattern P1 and the absolute pattern P2 are each provided on the top surface of the scale 3 in an annular shape (ring shape). Distances of the absolute pattern P2 and the incremental pattern P1 from the rotation shaft 2 in the radiation direction with respect to the rotation shaft 2 (positions in radial direction with respect to rotation shaft 2) are different from each other. The radiation direction with respect to the rotation shaft 2 may be translated into a radial direction of a rotator. The incremental pattern P1 and the absolute pattern P2 are concentrically provided, and the centers thereof substantially match with the center C1 of the scale 3. In the first embodiment, the incremental pattern P1 is provided on the outer side of the absolute pattern P2, but the incremental pattern P1 may be provided on the inner side of the absolute pattern P2.

For example, an illuminator 7 that irradiates the incremental pattern P1 and the absolute pattern P2 with light is provided above the scale 3. For example, the illuminator 7 includes a solid-state light source such as a light emitting diode (LED). The illuminator 7 may include another solid-state light source than the light emitting diode (for example, laser diode), or may include a ramp light source.

A detector 4 is provided below the scale 3 (on the side opposite to illuminator 7 across scale 3). A relative position of the detector 4 with respect to the incremental pattern P1 and a relative position of the detector 4 with respect to the absolute pattern P2 are changed along with the rotation of the rotation shaft 2. The detector 4 detects the incremental pattern P1 and the absolute pattern P2. In the case where the scale 3 is of a transmission type, the detector 4 detects light transmitted through the incremental pattern P1 and light transmitted through the absolute pattern P2 among light beams applied from the illuminator 7. The detector 4 may detect an image of the incremental pattern P1 and may detect an image of the absolute pattern P2. The detector 4 may be connected to the rotation shaft 2, and the incremental pattern P1 and the absolute pattern P2 are not necessarily required to be connected to the rotation shaft 2. Also in this case, the relative position of the detector 4 with respect to the incremental pattern P1 and the relative position of the detector 4 with respect to the absolute pattern P2 are changed along with the rotation of the rotation shaft 2.

Figure 2:
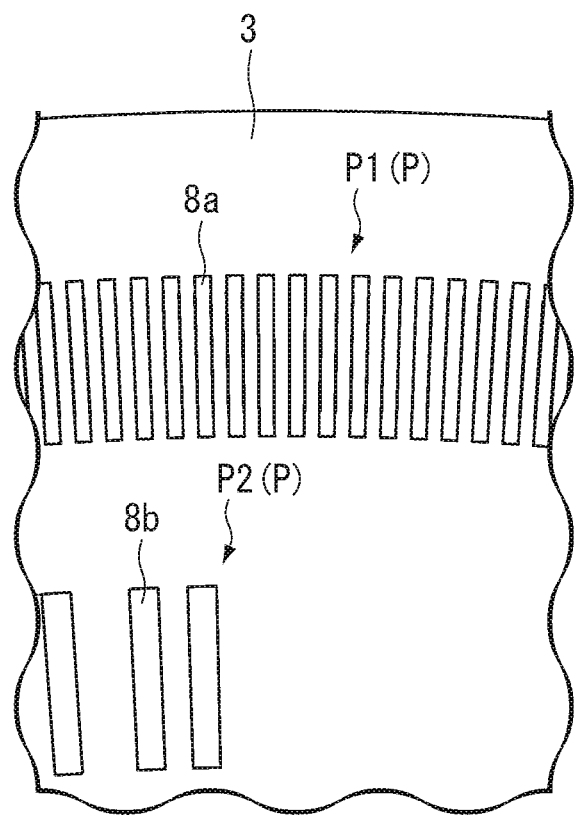
FIG. 2 is a diagram illustrating an example of an incremental pattern and an absolute pattern.

FIG. 2 is a diagram illustrating an example of the incremental pattern P1 and the absolute pattern P2. The incremental pattern P1 includes a plurality of slits 8a. Each of the slits 8a is a rectangular figure that radially extends from the center C1 (see FIG. 1) of the scale 3, For example, the slits 8a are arranged equiangularly in the circumferential direction of the scale 3.

The absolute pattern P2 includes slits 8b. Each of the slits 8b is a rectangular figure that radially extends from the center C1 (see FIG. 1) of the scale 3. For example, the slits 8b are arranged nonequiangularly in the circumferential direction of the scale 3. An arrangement pattern of continuous slits 8b is associated with a rotation position on the scale 3. For example, the encoder apparatus EC is able to specify a rotation position (absolute position) of the scale 3 by detecting an array pattern of continuous slits 8b.

Figure 3A:
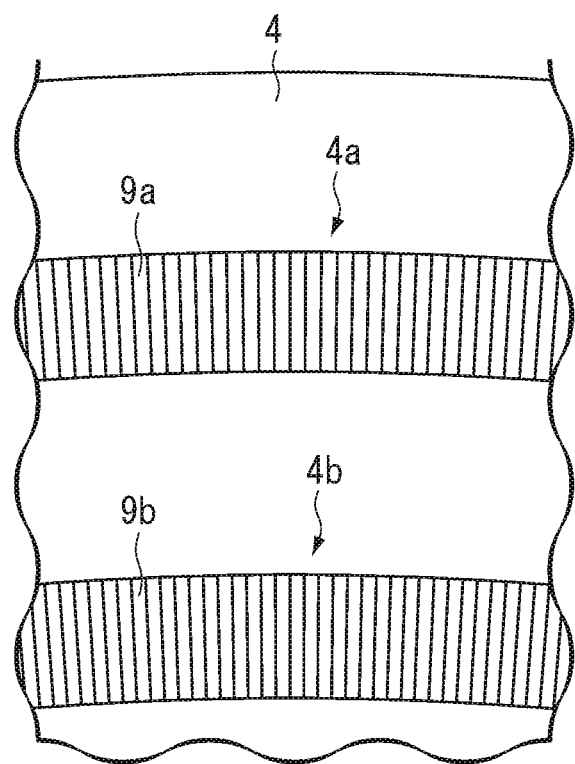
FIGS. 3A and 3B are diagrams illustrating an example of a detector
Figure 3B:
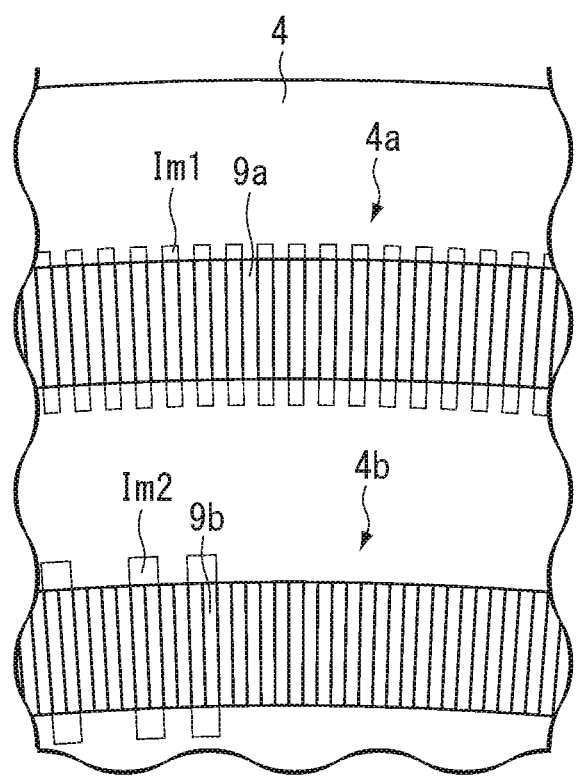

FIGS. 3A and 3B are diagrams illustrating an example of the detector 4. FIG. 3A is a diagram illustrating the detector 4 as seen from the +Z direction. FIG. 3B is a diagram illustrating images Im1 of the incremental pattern P1 and images Im2 of the absolute pattern P2 on the detector 4.

As illustrated in FIG. 3A, for example, the detector 4 includes a detector 4a and a detector 4b. The detector 4a includes strip-shaped light receiving sensors 9a. The light receiving sensors 9a are arranged in an arc (part of ring) region so as to correspond to the incremental pattern P1. The detector 4b includes strip-shaped light receiving sensors 9b. The light receiving sensors 9b are arranged in an arc region so as to correspond to the absolute pattern P2. A detection region of the light receiving sensor 9a and a detection region of the light receiving sensor 9b are each a rectangular region. In other words, a detection region of the detector 4 includes a plurality of rectangular regions arranged in the circumferential direction of the rotation shaft 2.

As illustrated in FIG. 3B, images Im1 are formed on the light receiving sensors 9a by light transmitted through the incremental pattern P1. Each of the light receiving sensors 9a outputs a voltage corresponding to the amount of the received light (hereinafter referred to as "output voltage"). The detector 4a outputs, as the detection result, the output voltages of the light receiving sensors 9a to the EC controller 5. Images Im2 are formed on the light receiving sensors 9b by light transmitted through the absolute pattern P2. Each of the light receiving sensors 9b outputs a voltage corresponding to the amount of the received light (hereinafter referred to as "output voltage"). The detector 4b outputs, as the detection result, the output voltages of the light receiving sensors 9b to the EC controller 5.

Returning to the description with reference to FIG. 1, the EC controller 5 includes, for example, a rotation information calculator 10, an eccentricity information calculator 11, and a corrector 12. In this case, the EC controller 5 may further include a storage 13 (eccentricity information storage, eccentricity correction amount storage). In another aspect, the EC controller 5 includes a rotation information calculator 10, a corrector 12, and a storage 13. In this case, the EC controller 5 may further include an eccentricity information calculator 11. The rotation information calculator 10 uses the detection result of the detector 4 to calculate rotation information on the rotation shaft 2. The eccentricity information calculator 11 uses the detection result of the detector 4 to calculate eccentricity information between the rotation shaft 2 and the scale 3. The corrector 12 uses the eccentricity information between the rotation shaft 2 and the scale 3 to correct the rotation information.

For example, the rotation information calculator 10 includes a signal processing circuit (not shown). For example, the rotation information calculator 10 calculates the rotation information on the rotation shaft 2 based on output voltages of the light receiving sensors 9a in the detector 4a and output voltages of the light receiving sensors 9b in the detector 4b. The rotation information calculator 10 amplifies and AD-coverts the output voltage of the light receiving sensor 9b in the detector 4b to generate an absolute signal in a digital form. The rotation information calculator 10 calculates a rotation position of the rotation shaft 2 by using the absolute signal and a reference table. For example, the reference table is information in which an array pattern of "0" and "1" of the absolute signal is associated with the rotation position of the rotation shaft 2. The rotation information calculator 10 collates the absolute signal with the reference table to calculate a first rotation position that expresses the rotation position of the rotation shaft with a first resolution. For example, the rotation information calculator 10 performs predetermined interpolation processing based on the output voltage of the light receiving sensor 9a in the detector 4a (for example, by using an A-phase signal and a B-phase signal) to calculate a rotation angle (change amount of rotation position) that is expressed with a second resolution higher than the first resolution. For example, the rotation information calculator 10 combines the first rotation position expressed with the first resolution and the rotation angle expressed with the second resolution to calculate a second rotation position having a resolution higher than that of the first rotation position.

The rotation information is information on the rotation of the rotation shaft 2, and includes the rotation position of the rotation shaft 2. For example, the rotation information includes at least one of a rotation position (angular position), a rotation angle (change amount of rotation position), an angular velocity, and an angular acceleration of the rotation shaft 2. For example, the rotation position of the rotation shaft 2 is a rotation angle from a reference position. The rotation information may be either information that does not distinguish the number of rotations (hereinafter referred to as "single rotation information") or information that distinguishes the number of rotations (hereinafter referred to as "multi-rotation information"). For example, when the change amount of the rotation position is 400°, the single rotation information is expressed by a value of 40° (400°-360°=40°) that ignores the number of rotations (one rotation, 360°). The single rotation information is expressed by a value of 40° in either case where the change amount of the rotation position is 40° or the change amount of the rotation position is 400° which is expressed by the same value. For example, when the change amount of the rotation position is 400°, the multi-rotation information is expressed by a value of 400° or a value of one rotation and 40°. For example, the rotation information is expressed by binary numbers with a predetermined number of bits, and may be either a value converted into degrees (deg) or a value converted into radians (rad).

In some cases, the scale 3 may be eccentric with respect to the rotation shaft 2 due to manufacturing errors, mounting errors, and secular changes. When the scale 3 is eccentric with respect to the rotation shaft 2, an error occurs in rotation information acquired from the detection result of the detector 4. The encoder apparatus EC according to the first embodiment is able to correct the error caused by eccentricity as described above. The eccentricity information calculator 11 calculates a correction amount of an error caused by eccentricity as eccentricity information. The corrector 12 corrects the rotation information calculated by the rotation information calculator 10 by using the correction amount calculated by the eccentricity information calculator 11. The correction amount calculated by the eccentricity information calculator 11 may be temporarily stored in the storage 13. In this case, the corrector 12 corrects the rotation information calculated by the rotation information calculator 10 by using the correction amount stored in the storage 13. The corrector 12 may correct the rotation information calculated by the rotation information calculator 10 based on eccentricity information output from the storage 13 without using the correction amount calculated by the eccentricity information calculator. The EC controller 5 outputs the rotation information corrected by the corrector 12 to the outside. A method of correcting an error caused by eccentricity is now described, and then the eccentricity information calculator 11, the storage 13, and the corrector 12 are described.

Figure 4A:
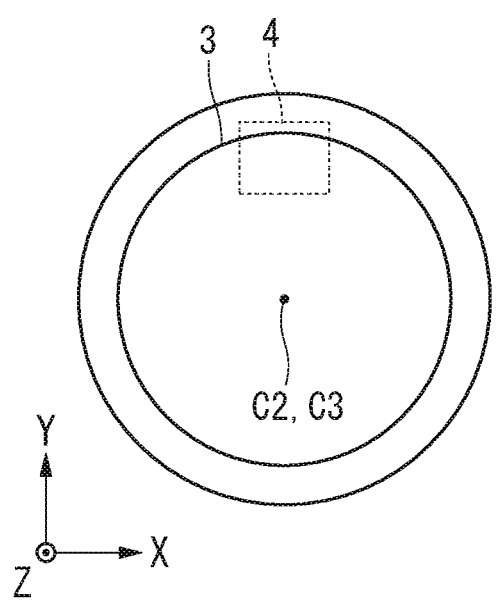
FIGS. 4A and 4B are diagrams illustrating a positional relation between a rotation shaft and a scale.
Figure 4B:
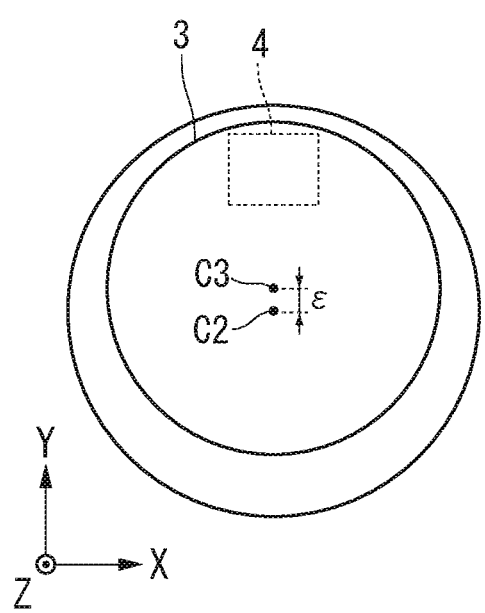

FIGS. 4A and 4B are diagrams illustrating the positional relation between the rotation shaft 2 and the scale 3. In FIG. 4A, FIG. 4B, and other figures, symbol C2 represents an intersection between the same plane as the detector 4 (detector 4a, detector 4b) and the rotation center axis (axis AX1 in FIG. 1), and the intersection is hereinafter referred to as "rotation center C2". Symbol C3 represents the center of the scale 3 projected on the same plane as the detector 4 (light receiving sensor 4a, light receiving sensor 4b), and the center is hereinafter referred to as "scale center C3". FIG. 4A illustrates a state in which the scale 3 is not eccentric with respect to the axis AX1 (see FIG. 1) (hereinafter referred to as "non-eccentric state"). In the non-eccentric state, the scale center C3 matches with the rotation center C2. FIG. 4B illustrates a state in which the scale 3 is eccentric with respect to the rotation center axis (axis AX1) (hereinafter referred to as "eccentric state"). In the eccentric state, the scale center C3 does not match with the rotation center C2. Symbol ε in FIG. 4B represents a distance between the scale center C3 and the rotation center C2 in a plane (XY plane) perpendicular to the rotation center axis (axis AX1) of the rotation shaft 2 (hereinafter referred to as "eccentric amount").

Figure 5A:
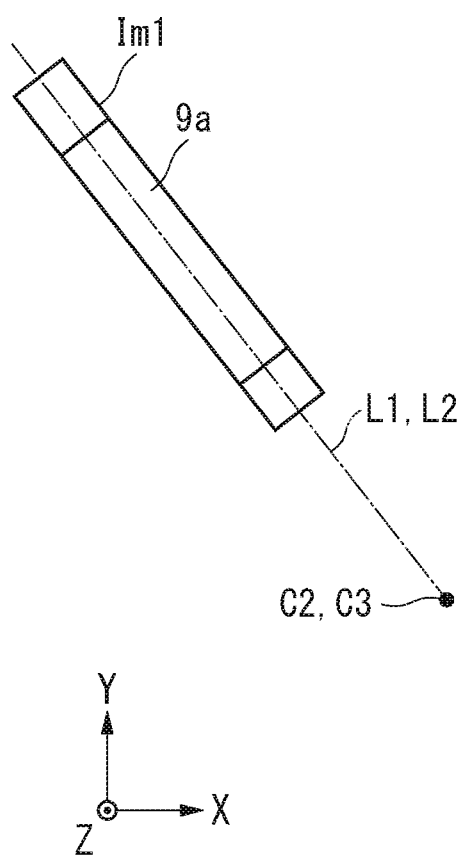
FIGS. 5A to 5C are diagrams illustrating a positional relation between an image of a pattern and a light receiving sensor.
Figure 5B:
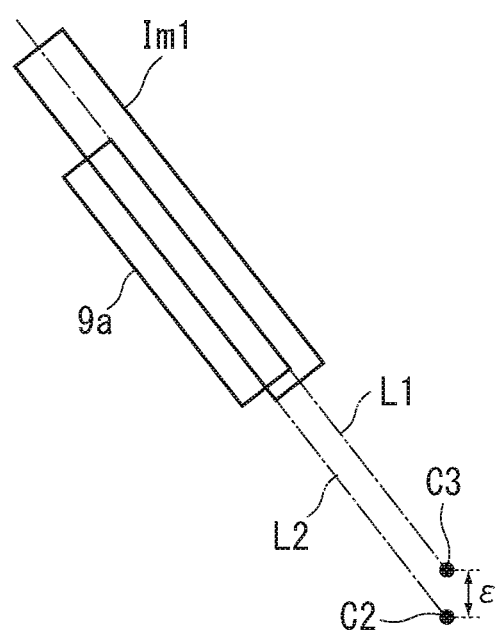
Figure 5C:
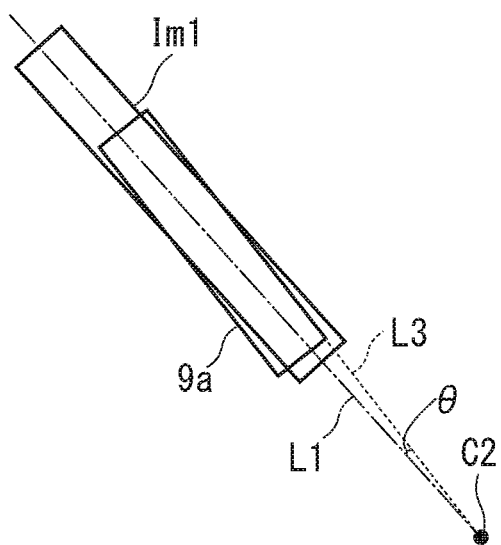

FIGS. 5A to 5C are diagrams illustrating the positional relation between image Im1 and the light receiving sensor 9a. FIG. 5A corresponds to a non-eccentric state, and FIG. 5B and FIG. 5C correspond to eccentric states. In FIGS. 5A to 5C, the chain line indicated by symbol L1 is a center line of the image Im1, and the chain line indicated by symbol L2 is a center line of the light receiving sensor 9a. As illustrated in FIG. 5A, in the non-eccentric state, the scale center C3 matches with the rotation center C2, and the image Im1 rotates about the rotation center C2 along with the rotation of the rotation shaft 2. In the non-eccentric state, when the center line L1 of the image Im1 and the center line L2 of the light receiving sensor 9a are aligned with each other, the overlap area between the image Im1 and the light receiving sensor 9a is maximum, and the output voltage of the light receiving sensor 9a is maximum.

In FIG. 5B, the scale center C3 is shifted from the rotation center C2 by an eccentric amount ε the Y direction. In FIG. 5B, the rotation position of the rotation shaft 2 (rotation position of scale 3) is the same as that in FIG. 5A, but because the scale 3 is eccentric, the overlap area between the image Im1 and the light receiving sensor 9a is not maximum. In other words, the rotation position of the rotation shaft 2 is the same in FIG. 5A and FIG. 5B, but the timing at which the output voltage of the light receiving sensor 9a peaks is shifted between FIG. 5A and FIG. 5E. Eccentricity information on the scale is obtained from the shift between the timing of a peak of a first detection signal obtained when the detector detects the first pattern and the timing of a peak of a second detection signal obtained when the detector detects the second pattern.

FIG. 5C illustrates a state in which the rotation shaft 2 rotates by θ° in the clockwise direction from the state in FIG. 5E, and the overlap area between the image Im1 and the light receiving sensor 9a is maximum. Specifically, when the influence of eccentricity is not taken into consideration, the rotation position in the state in FIG. 5A is obtained as the rotation position of the rotation shaft 2 from the output voltage of the light receiving sensor 9a in the state in FIG. 5C, and an error of θ° occurs. In other words, when the rotation position obtained from the output voltage of the light receiving sensor 9a in the state in FIG. 5C is corrected by θ°, rotation information with the reduced error is able to be obtained. θ is hereinafter referred to as "eccentric error".

Next, a method of calculating the eccentric error θ is described. In the first embodiment, the eccentric error θ is calculated by using a phase difference D of a signal based on an absolute pattern from a signal based on an incremental pattern.

Figure 6A:
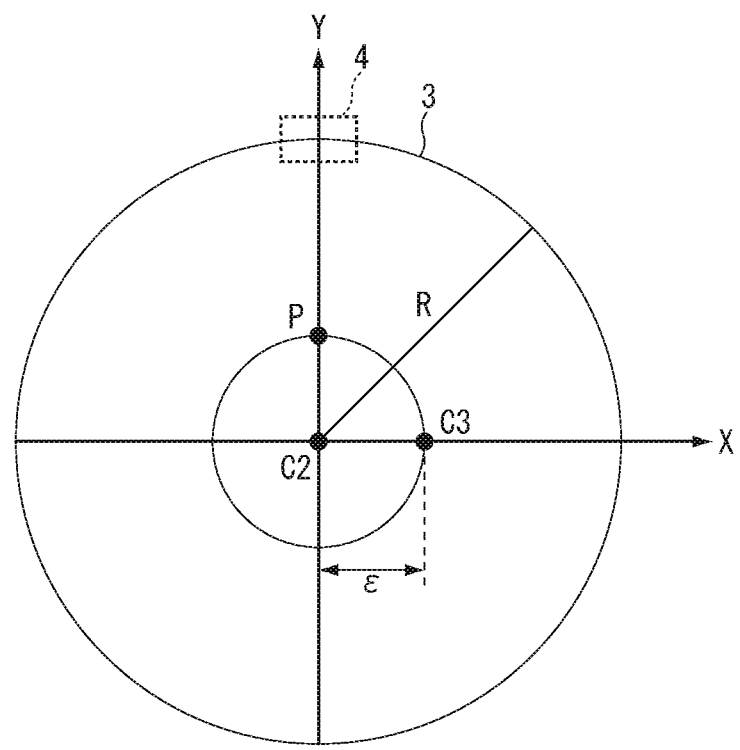
FIGS. 6A and 6B are diagrams illustrating a relation between an eccentric amount and an eccentric error.
Figure 6B:
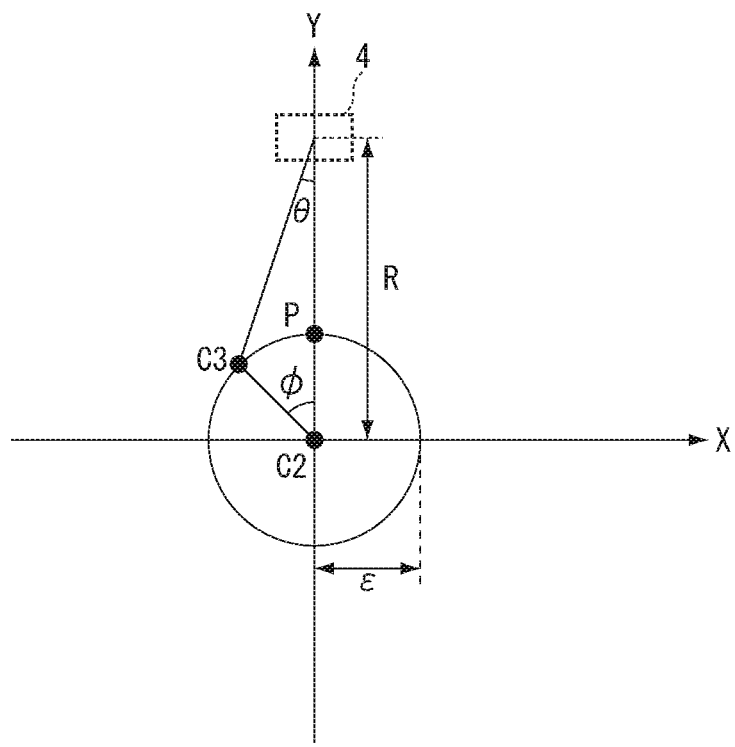

First, the relation between the eccentric amount ε and the eccentric error θ is described. FIGS. 6A and 6B are diagrams illustrating the relation between the eccentric amount ε and the eccentric error θ. When an angle formed by a line connecting the rotation center C2 and the scale center C3 and the Y direction is represented by φ, the eccentric error θ is expressed by Equation (1) below by using the eccentric amount ε and the radius R of the scale (incremental pattern P1).

[Math. 1]

As Equation (1) is modified, the eccentric error θ is expressed by Equation (2) below.

[Math. 2]

Figure 7:
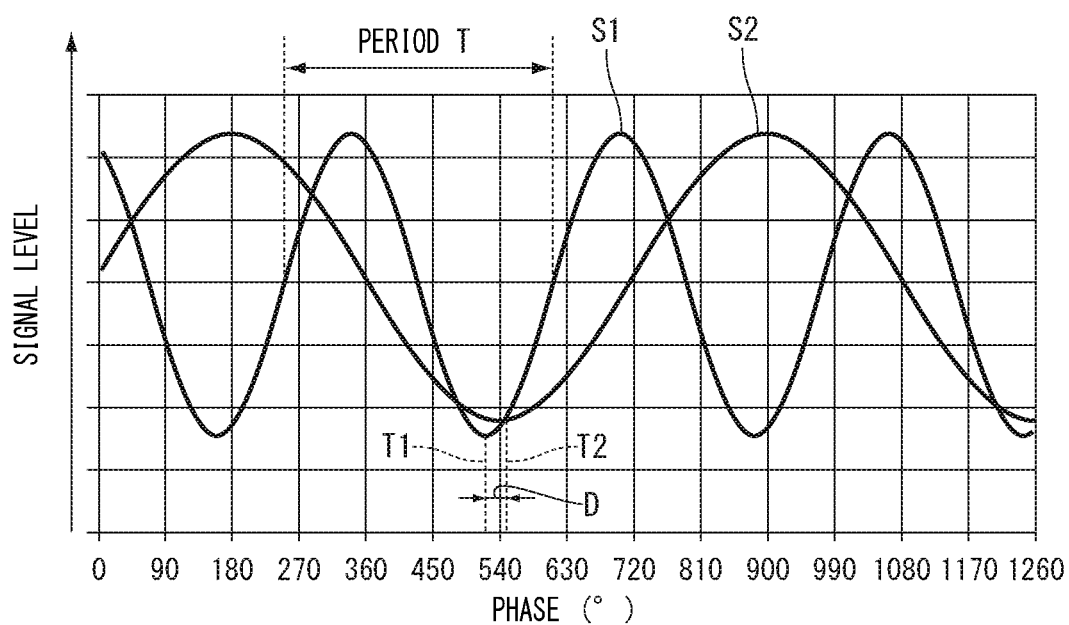
FIG. 7 is a diagram illustrating an example of a signal corresponding to a first detection result and a signal corresponding to a second detection result.

The eccentricity information calculator 11 calculates eccentricity information by using a first detection result obtained when the detector 4 detects the incremental pattern P1 and a second detection result obtained when the detector 4 detects the absolute pattern P2. FIG. 7 is a diagram illustrating an example of a signal S1 corresponding to the first detection result and a signal S2 corresponding to the second detection result. The signal S1 is a signal corresponding to an average of results of detecting two or more rectangular figures in the incremental pattern P1. The signal S1 corresponds to a signal obtained by integrating (summing) the output voltages of all the light receiving sensors 9a in the detector 4a that detects the incremental pattern P1. The signal S2 is a signal corresponding to a detection result corresponding to the rectangular regions (light receiving sensors 9b) in the detection region of the detector 4. The signal S2 corresponds to an output voltage of one light receiving sensor 9b (for example, bit on edge) of the detector 4b that detects the absolute pattern P2.

When the scale 3 is eccentric, a phase difference D occurs between the signal S1 and the signal S2. The eccentricity information calculator 11 calculates eccentricity information by using the phase difference D between the signal S1 and the signal S2. For example, the eccentricity information calculator 11 calculates, as the phase difference D, a shift amount of peak positions of signals corresponding to detection results of the detector 4, the shift being caused by eccentricity between the rotation shaft 2 and the scale 3. The eccentricity information calculator 11 calculates the phase difference D, and calculates an eccentric error θ by using the calculated phase difference D. For example, the eccentricity information calculator 11 calculates the phase difference D based on Equation (3) below. In Equation (3), T is a period of the signal S1, T1 is a phase with which the signal S1 has an extreme value (for example, minimum value), and T2 is a phase closest to T1 among phases with which the signal S2 has an extreme value (for example, minimum value).

[Math. 3]

It is assumed here that the distance by which the scale 3 moves in the +Y direction with respect to the detector 4 (for example, light receiving sensor 9a, light receiving sensor 9b) is d. The movement amount d becomes equal to the eccentric amount ε at a given rotation angle (for example, when scale center C3 is located at point P illustrated in FIG. 6(A)). Thus, the movement amount d is determined by using the phase difference D, and the movement amount d is substituted for ε in Equation (2), to thereby enable to determine the correction value θ.

The relation between the movement amount d and the phase difference D is described below.

Figure 8A:
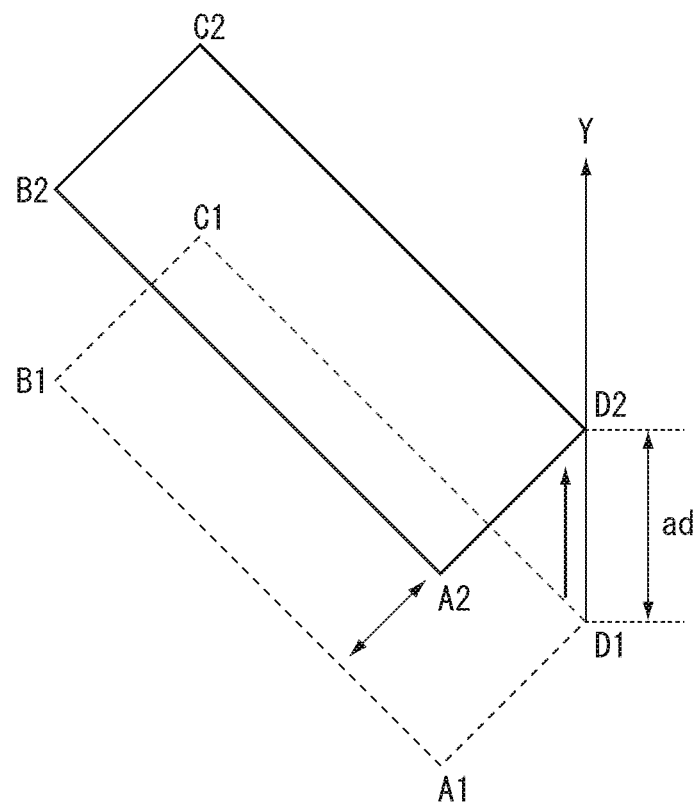
FIGS. 8A and 8B are explanatory diagrams illustrating a relation between a phase difference and an eccentric amount.
Figure 8B:
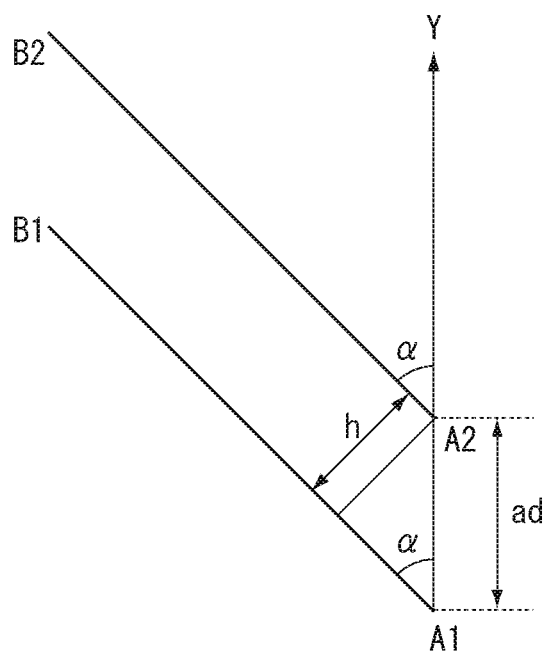

FIGS. 8A and 8B are explanatory diagrams illustrating the relation between the phase difference D and the eccentric amount ε. It is assumed that the image Im2 is enlarged as compared with the absolute pattern P2 and the scale factor is a. a is an eigenvalue of an encoder determined by distances of the illuminator 7, the scale 3, and the detector 4. The image Im2 on the light receiving sensor moves in the +Y direction by a distance ad.

It is assumed here that vertices of an image Im2 formed on one light receiving sensor 9b (for example, bit on edge) are A1, E1, C1, and D1. Vertices of the image Im2 on the light receiving sensor 9b after the scale 3 is moved are A2, B2, C2, and D2. The distance between a side between the vertex A1 and the vertex B1 and a side between the vertex A2 and the vertex B2 is h. When an angle formed by the side between the vertex A1 and the vertex B1 and the Y direction is α, h is expressed by the following Equation (4) because the distance between the vertex A1 and the vertex A2 is ad.
[Math. 4]

When the length of one pitch (circumferential length of a set of bright and dark patterns) of an image of the incremental pattern P1 formed on the light receiving sensor 9a is P, the phase difference D is expressed by the following Equation (5).
[Math. 5]

By modifying Equation (5), the movement amount d is expressed by the following Equation (6) using the phase difference D.
[Math. 6]

For example, when the scale center C3 is located at a point P illustrated in FIG. 6(A), the eccentric amount ε is equal to the movement amount d, and hence ε=d is established. By substituting Equation (6) into Equation (2), the following Equation (7) is obtained as an equation representing the eccentric error θ.
[Math. 7]

As indicated by Equation (6), d is able to be determined with use of D and the eigenvalue of the encoder. The phase difference D is affected by the number of rotations of the rotation shaft 2, the shape and dimensions of the light receiving sensor, and the direction in which the scale center C3 is shifted from the rotation shaft 2. Even when the phase difference D is affected by such factors, the phase difference D is proportional to the movement amount d of the scale 3. Thus, the phase difference D taking the above-mentioned influence into account is expressed by the following Equation (8) using a coefficient k.
[Math. 8]

The coefficient k is determined by the number of rotations of the rotation shaft 2, the shape and dimensions of the light receiving sensor, and other such factors. Values of k obtained when these parameters are systematically changed are stored in the form of table data in advance. Referring to the information, the movement amount d is able to be determined based on the phase difference D obtained from the detection result. For example, the coefficient k is calculated for each product before shipment and stored in the storage 13 in advance. Then, an eccentric error is calculated based on the k stored in advance in accordance with the number of rotations, and rotation information is corrected. For example, the number of rotations and the eccentric direction of the rotation shaft 2 are able to be calculated from rotation information before correction based on the current detection result or corrected rotation information based on the previous detection result.

For example, after the encoder apparatus EC is activated, the eccentricity information calculator 11 calculates eccentricity information by using detection results obtained when the detector 4 performs detection. For example, the eccentricity information calculator 11 represents, as eccentricity information, the coefficient k obtained when the number of rotations and the eccentric direction are systematically changed in the form of table data, and stores the table data in the storage 13. The timing at which the eccentricity information calculator 11 calculates the eccentricity information is freely set. For example, the calculation of the phase difference by the eccentricity information calculator 11 may be performed every predetermined time during the operation of the driver 1, may be performed only once each time the driver 1 is activated, or may be performed each time the driver 1 is activated a predetermined number of times.

Next, the storage 13 is described. The storage 13 stores eccentricity information (for example, correction amount) therein. For example, the storage 13 stores therein table data on correction amounts calculated by the eccentricity information calculator 11. The storage 13 further stores therein computer programs necessary for the operation of the encoder apparatus EC and data calculated by each of the units. For example, the storage 13 is a non-volatile memory such as a flash memory.

The corrector 12 corrects rotation information by using eccentricity information between the rotation shaft and the scale 3. For example, the corrector 12 acquires rotation information calculated by the rotation information calculator 10, and acquires eccentricity information (for example, correction amount) corresponding to the rotation information from the storage 13. For example, the corrector 12 corrects the rotation information (for example, rotation position) by a correction amount determined by the eccentricity information. The eccentricity information calculator 11 may calculate information (for example, eccentric amount) in a stage Prior to a correction amount as the eccentricity information, and the corrector 12 may calculate the correction amount based on the calculation result of the eccentricity information calculator 11 and correct the rotation information. For example, the corrector 12 may calculate the correction amount based on the eccentric amount a calculated by the eccentricity information calculator 11. The corrector 12 outputs the corrected rotation information to the outside (for example, controller for driver 1). For example, the driver 1 is controlled by the corrected rotation information.

Next, an example of the correction of rotation information is described. In the present example, the dimensions of the scale 3 and parameters such as a coefficient k are values set for convenience of description and are not necessarily the same as actual values. It is assumed here that the detection radius is 10 mm and the eccentric amount ε is 15 μm (0.015 mm). An eccentric error θ in this case is calculated as 10.3 (minutes of arc) at most based on the following Equation (9) by substituting 10 mm as the detection radius into R in the above Equation (2) and substituting 0.015 mm into the eccentric amount ε.
[Math. 9]

It is assumed here that the number of rotations of the scale is 100 [rpm] and the coefficient k indicated by the above Equation (8) is 0.065 [deg/μm]. The eccentricity information calculator 11 substitutes k=0.065 and d=15 [μm] into the above Equation (8) and applying the condition where the movement amount d is equal to the eccentric amount ε to calculate the phase difference P1 and the phase difference P2 as follows.

$$P1 = -0065[\text{deg}/\mu\text{m}] \times 15[\mu\text{m}] = -0.975[\text{deg}]$$

$$P2 = 0.065[\text{deg}/\mu\text{m}] \times 15[\mu\text{m}] = 0.975[\text{deg}]$$

The value of the eccentric error θ includes an error, and the error depends on detection accuracy of the phase difference. It is assumed here that the detection accuracy of the phase difference is ±0.1 [deg], P1 has an error of +0.1 [deg], and P2 has an error of −0.1 [deg]. Movement amounts d (eccentric amounts ε) are calculated from the phase difference P1 and the phase difference P2 as follows based on the above Equation (8).

$$d = P1 + 0.1/-0.065 = -0.875/-0.065 = 13.5[\mu\text{m}]$$

$$d = P2 - 0.1/+0.065 = 0.875/0.065 = 13.5[\mu\text{m}]$$

In this example, the absolute values of the error with the opposite signs are added to P1 and P2. In actuality, however, the eccentric error may be random within the range of ±0.1 [deg]. in this case, an average value may be used as an eccentric amount calculated from the above-mentioned P1 and P2. For example, when the eccentric amount is 13.5 μm, the eccentric error θ is calculated by the following Equation (10).
[Math. 10]

By setting the value calculated by Equation (10) as a correction value, the eccentric error θ is calculated by the following Equation (11).
[Math. 11]

In the case where the absolute values of the error with the opposite signs are added to P1 and P2 as described above, the deviation of the calculated eccentric amount ε from a true value has the maximum value. Thus, for example, when the detection accuracy of the phase difference D is within ±0.1 [deg], an eccentric error of 10 minutes of arc is able to be reduced to about 1 minute of arc, and hence the eccentric error θ is able to be reduced to about ¹⁄₁₀.

Figure 9:
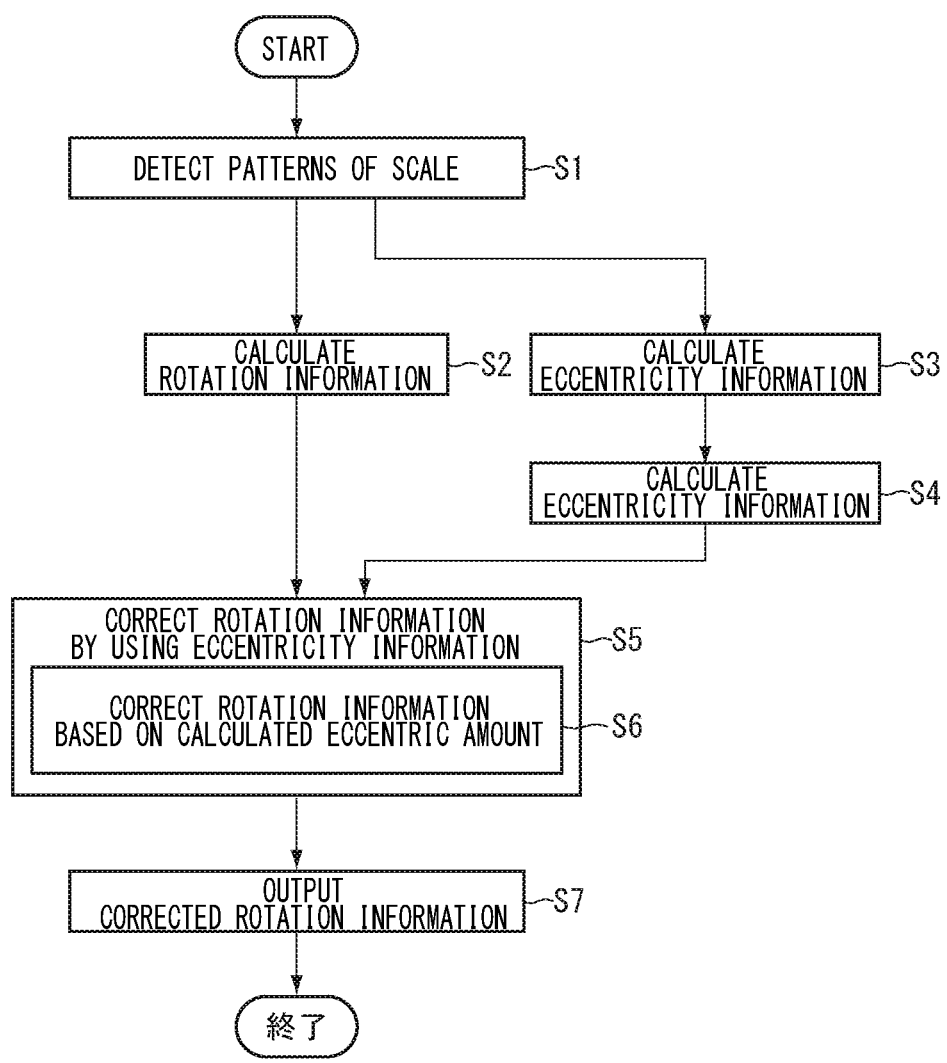
FIG. 9 is a flowchart illustrating an operation of an encoder apparatus.

Next, a rotation information acquisition method according to the embodiment is described based on the operation of the encoder apparatus C. FIG. 9 is a flowchart illustrating the operation of the encoder apparatus EC. At Step S1, the detector 4 detects a predetermined pattern P of the scale 3 provided to the rotation shaft 2 of the driver 1. For example, the detector 4 detects each of the incremental scale P1 and the absolute pattern P2 of the scale 3. At Step S2, the rotation information calculator 10 calculates rotation information on the rotation shaft 2 based on the result of detection by the detector 4. At Step S3, the eccentricity information calculator 11 calculates eccentricity information. For example, the eccentricity information calculator 11 calculates the eccentricity information by using a first detection result obtained when the detector 4b detects the absolute pattern P2 and a second detection result obtained when the detector 4a detects the incremental pattern P1. For example, the eccentricity information calculator 11 calculates at least one of an eccentric amount and an eccentric error by using a phase difference D between a signal S1 corresponding to the first detection result and a signal S2 corresponding to the second detection result. For example, the eccentricity information calculator 11 calculates a correction amount corresponding to an eccentric error θ as the eccentricity information. At Step S4, the eccentricity information calculator 11 stores the calculation result (eccentricity information) in the storage 13. For example, the eccentricity information calculator 11 stores the calculated eccentric amount or eccentric error (for example, correction amount) in the storage 13. At Step S5, the corrector 12 corrects the rotation information by using eccentricity information between the rotation shaft 2 and the scale 3. For example, at Step S6, the corrector 12 corrects the rotation information based on the eccentric amount calculated by the eccentricity information calculator 11. For example, the corrector 12 corrects the rotation information by using an eccentric error θ (correction amount) corresponding to an eccentric amount ε calculated by the eccentricity information calculator 11 and stored in the storage 13. At Step S7, the EC controller 5 outputs the rotation information corrected by the corrector 12. For example, the EC controller 5 outputs the rotation information corrected by the corrector 12 to a controller that controls the driver 1, and the controller controls the driver 1 based on the corrected rotation information.

In the above-mentioned embodiments, the EC controller includes a computer (for example, microcomputer) including a general-purpose computer such as a CPU and a work memory, and a non-volatile memory (for example, storage 13). At least some of the rotation information calculator 10, the eccentricity information calculator 11, and the corrector 12 is configured such that the computer executes various kinds of processing in accordance with a computer program stored in the non-volatile memory. A rotation information acquisition program for acquiring rotation information on a rotation shaft by using an encoder apparatus including: a scale that has a first pattern and a second pattern; and a detector with a relative position with respect to the first pattern and a relative position with respect to the second pattern changed by rotation of the rotation shaft to detect the first pattern and the second pattern causes a computer to execute: calculating rotation information by using detection results obtained when the detector detects the first pattern and the second pattern; storing eccentricity information between the rotation shaft and the scale in a storage; and correcting the rotation information based on the eccentricity information output from the storage and the detection results, in which the storage stores eccentricity information on the scale calculated based on a phase difference between a signal corresponding to a first detection result obtained when the detector detects the first pattern and a signal corresponding to a second detection result obtained when the detector detects the second pattern. The rotation information acquisition program may be provided by being recorded in a computer-readable storage medium.

As described above, the encoder apparatus EC, the rotation information acquisition method, and the rotation information acquisition program according to the first embodiment are able to acquire rotation information with high accuracy. The encoder apparatus EC detects an eccentric amount and creates a correction value by the apparatus itself, and hence an encoder for calibration is not needed. The encoder apparatus EC corrects an eccentric error by the apparatus itself, and hence the cost and burden necessary for reducing an eccentric error at the time of manufacturing are able to be reduced. A highly accurate encoder for calibration is not needed, and hence accuracy correction is able to be achieved simply at low cost. The encoder apparatus EC corrects an eccentric error by the apparatus itself, and hence a permissible amount of the eccentric error is increased. In the case where an eccentric error is corrected based on a phase difference of patterns P on the scale 3, it is not necessary to additionally provide a detector that detects the eccentric error (reference angle detector). In other words, the phase difference is able to be measured in environments to be actually used, without the need of mounting the encoder apparatus EC to a dedicated tool. The encoder apparatus EC is able to perform correction including influence of eccentricity and declination of a mating shaft in a finally mounted state.

Second Embodiment

A second embodiment is described. In the second embodiment, the same configurations as in the above-mentioned embodiment are denoted by the same reference symbols, and descriptions thereof are omitted or simplified.

In the second embodiment, an eccentric amount ε is measured in advance before the rotation information calculator 10 calculates rotation information, and the corrector 12 corrects the rotation information based on the eccentric amount ε. For example, the eccentric amount ε is measured by an inspection apparatus at the time of manufacturing of the encoder apparatus EC. Eccentricity information (for example, eccentric error θ, correction amount) is calculated based on the measurement result and stored in the storage 13 illustrated in FIG. 1. The corrector 12 (see FIG. 1) corrects the rotation information based on the eccentricity information stored in the storage 13. In the case where an eccentric amount ε is stored in the storage 13 as the eccentricity information, the eccentricity information calculator 11 or the corrector 12 may calculate a correction amount by using the eccentric amount ε stored in the storage 13. In the case where a correction amount is stored in the storage 13 as the eccentricity information, the corrector 12 may correct the rotation information by using the correction amount stored in the storage 13. In this case, for example, the encoder apparatus EC is not necessarily required to include the eccentricity information calculator 11.

Figure 10:
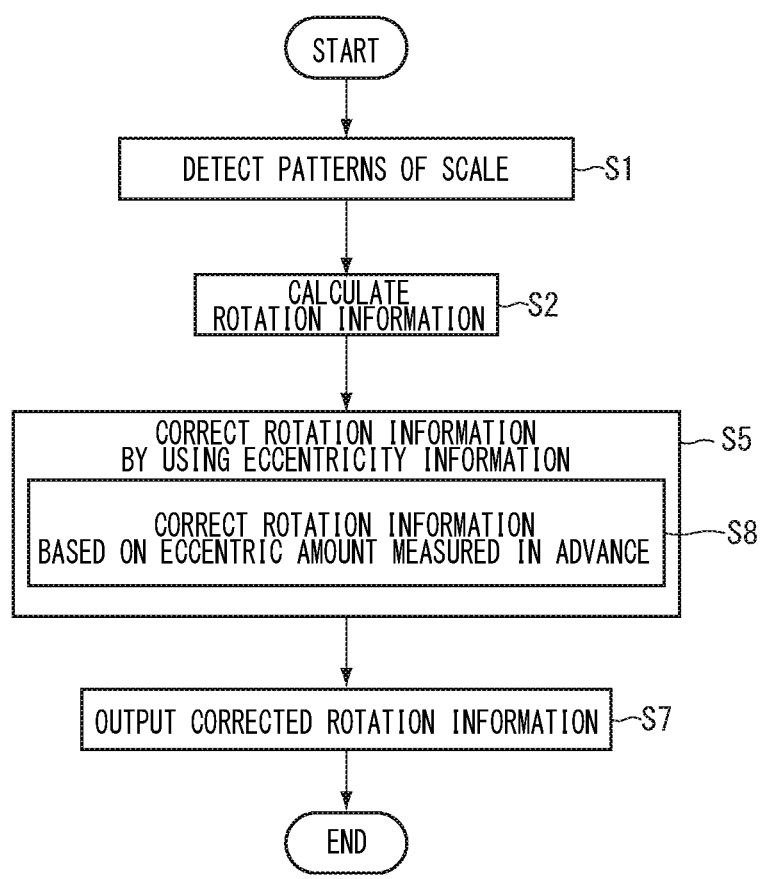
FIG. 10 is a flowchart illustrating the operation of the encoder apparatus.

FIG. 10 is a flowchart illustrating the operation of the encoder apparatus EC. At Step S1, the detector 4 detects a predetermined pattern P of the scale 3 provided to the rotation shaft 2 of the driver 1. For example, the detector 4 detects each of an incremental scale P1 and an absolute pattern P2 of the scale 3. At Step S2, the rotation information calculator 10 calculates rotation information on the rotation shaft 2 by using the result of detection by the detector 4. At Step S5, the corrector 12 corrects the rotation information by using eccentricity information between the rotation shaft 2 and the scale 3. As described above, the eccentricity information is stored in the storage 13 in advance before the rotation information calculator 10 calculates the rotation information at Step S8. The corrector 12 corrects the rotation information based on eccentric amount ε stored in the storage 13. At Step S7, the rotation information corrected by the corrector 12 is output. For example, the EC controller 5 outputs the rotation information corrected by the corrector 12 to a controller that controls the driver 1, and the controller controls the driver 1 based on the corrected rotation information. Also in this case, the encoder apparatus EC is able to accurately acquire the rotation information.

Drive Apparatus

Next, a drive apparatus is described. FIG. 11 is a diagram illustrating an example of a drive apparatus MTR. In the following description, the same or equivalent components as in the above-mentioned embodiments are denoted by the same reference symbols, and descriptions thereof are omitted or simplified. The drive apparatus MTR is a motor apparatus including an electric motor. The drive apparatus MTR includes a rotation shaft 2, a main body (driver) BD that rotationally drives the rotation shaft 2, an encoder apparatus EC that detects rotation information on the rotation shaft 2, and a controller MC that controls the main body BD.

The rotation shaft 2 has a load-side end SFa and an anti-load-side end SFb. The load-side end SFa is connected to another power transmission mechanism such as a reducer. A scale (not shown) is fixed to the anti-load-side end SFb through a fixator. The encoder apparatus EC is the encoder apparatus described in the above-mentioned embodiments.

In the drive apparatus MTR, the controller MC controls the main body BD by using a detection result of the encoder apparatus EC (corrected rotation information). The drive apparatus MTR controls the main body BD by using rotation information in which an eccentric error is reduced by correction, and hence is able to control a rotation position of the rotation shaft 2 with high accuracy. The drive apparatus MTR is not limited to a motor apparatus, and may be another drive apparatus having a shaft that rotates with use of hydraulic pressure or pneumatic pressure.

Stage Apparatus

Figure 12:
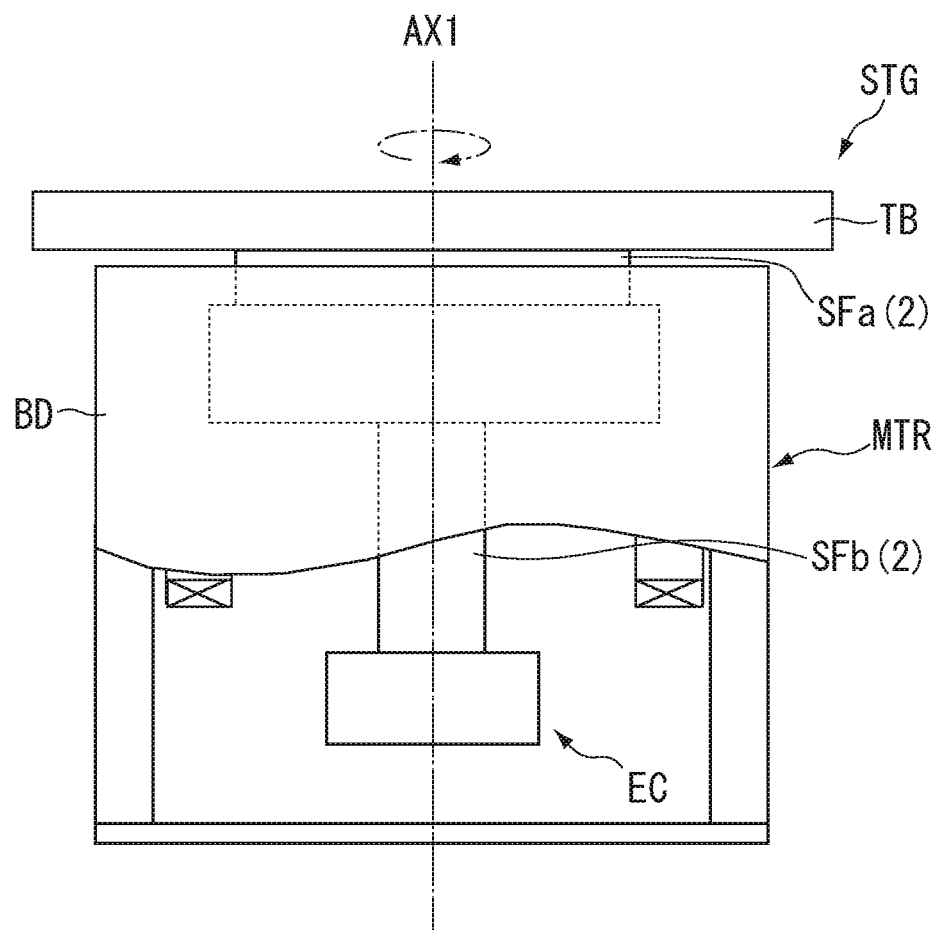
FIG. 12 is a diagram illustrating a stage apparatus.

Next, a stage apparatus is described. FIG. 12 is a diagram illustrating a stage apparatus STG. The stage apparatus STG has a configuration in which a rotary table (moving object) TB is mounted to the load-side end SFa of the rotation shaft 2 of the drive apparatus MTR illustrated in FIG. 11. In the following description, the same or equivalent components as in the above-mentioned embodiments are denoted by the same reference symbols, and descriptions thereof are omitted or simplified.

In the stage apparatus STG, when the drive apparatus MTR is driven to rotate the rotation shaft 2, the rotation of the rotation shaft 2 is transmitted to the rotary table TB. At this time, the encoder apparatus EC detects rotation information on the rotation shaft 2 (for example, rotation position). The use of the output from the encoder apparatus EC thus enables an angular position of the rotary table TB to be detected. A reducer or other components may be arranged between the load-side end SFa of the drive apparatus MTR and the rotary table TB.

As described above, in the stage apparatus STG, an eccentric error is reduced in rotation information output from the encoder apparatus EC, and hence the position of the rotary table TB is able to be controlled with high accuracy. For example, the stage apparatus STG is applicable to a rotary table included in a machine tool such as a lathe.

Robot Apparatus

Figure 13:
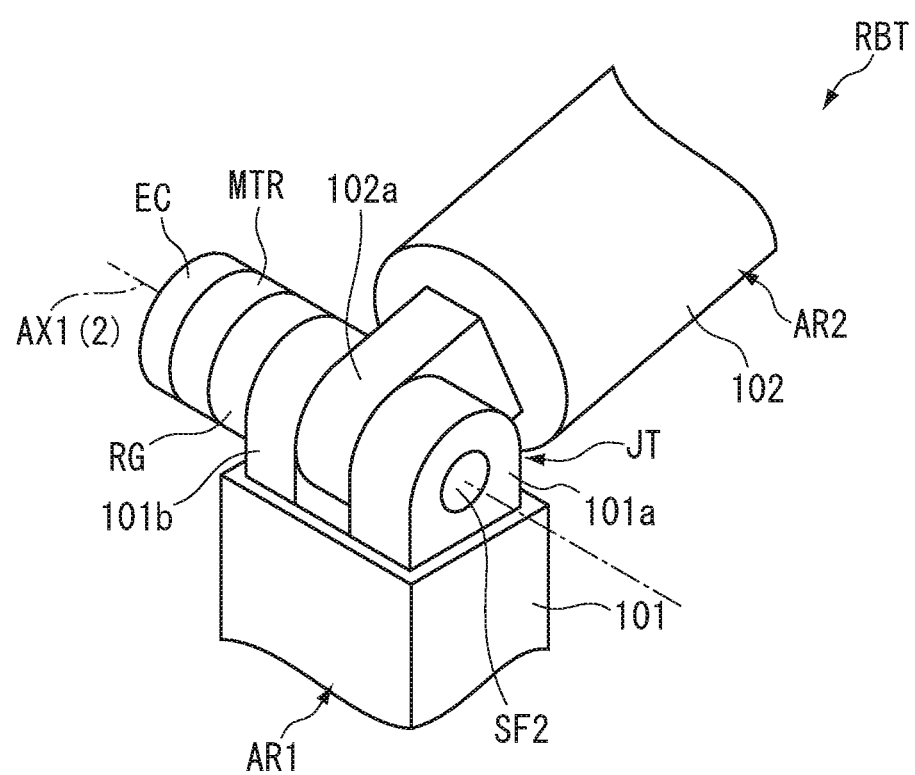
FIG. 13 is a perspective view illustrating a robot apparatus.

Next, a robot apparatus is described. FIG. 13 is a perspective view illustrating a robot apparatus RBT. In FIG. 13, a part of the robot apparatus RBT (joint) is schematically illustrated. In the following description, the same or equivalent components as in the above-mentioned embodiments are denoted by the same reference symbols, and descriptions thereof are omitted or simplified. The robot apparatus RBT includes a first arm AR1, a second arm AR2, and a joint JT. The first arm AR1 is connected to the second arm AR2 through the joint JT.

The first AR1 includes an arm 101, a bearing 101a, and a bearing 101b. The second arm AR2 has an arm 102 and a connector 102a. The connector 102a is disposed between the bearing 101a and the bearing 101b at the joint JT. The connector 102a is provided integrally with the rotation SF2. The rotation shaft SF2 is inserted through both the bearing 101a and the bearing 101b at the joint JT. An end of the rotation shaft SF2 that is inserted through the bearing 101b passes through the bearing 101b and is connected to a reducer RG.

The reducer RG is connected to the drive apparatus MTR, and reduces the rotation of the drive apparatus MTR to, for example, 1/100 and transmits the reduced rotation of the drive apparatus MTR to the rotation shaft SF2. Although not illustrated in FIG. 13, the load-side end of the rotation shaft 2 of the drive apparatus MTR is connected to the reducer RG. A scale (not shown) of the encoder apparatus EC is mounted to the anti-load-side end of the rotation shaft 2 of the drive apparatus MTR.

In the robot apparatus RBT, when the drive apparatus MTR is driven to rotate the rotation shaft 2, the rotation of the rotation shaft 2 is transmitted to the rotation shaft 2 through the reducer RG. The connector 102a rotates integrally with the rotation shaft SF2 by the rotation of the rotation shaft SF2. Thus, the second arm AR2 rotates with respect to the first arm AR1. At this time, the encoder apparatus EC detects rotation information on the rotation shaft 2 (for example, rotation position). The use of the output from the encoder apparatus EC thus enables an angular position of the second arm AR2 to be detected.

As described above, in the robot apparatus RBT, the encoder apparatus EC outputs rotation information with a reduced eccentric error, and hence the relative position between the first arm AR1 and the second arm AR2 is able to be controlled with high accuracy. The robot apparatus RBT is not limited to the above-mentioned configuration, and the drive apparatus MTR is applicable to various kinds of robot apparatuses having a joint.

The technical scope of the present invention is not limited to the aspects described in the above-mentioned embodiments. One or more elements described in the above-mentioned embodiments may be omitted. The elements described in the above-mentioned embodiments are able to be combined as appropriate. As far as permitted by the applicable law, the disclosure of all the documents cited in the above-mentioned embodiments is incorporated herein by reference.

[Math. 1]
$$\tan\theta = \frac{\varepsilon \sin \phi}{R} \tag{1}$$

[Math. 2]
$$\theta = \tan^{-1}\left(\frac{\varepsilon \sin \phi}{R}\right) \tag{2}$$

[Math. 3]
$$D = \frac{(T_1 - T_2)}{T} \times 360 \ [deg] \tag{3}$$

[Math. 4]
$$h = ad \sin \alpha \tag{4}$$

[Math. 5]
$$D = \frac{h}{P} \times 360 = \frac{ad \sin \alpha}{P} \times 360 \ [deg] \tag{5}$$

[Math. 6]
$$d = \frac{DP}{360 \, a \sin \alpha} \tag{6}$$

[Math. 7]
$$\theta = \tan^{-1}\left(\frac{DP \sin \phi}{360 \, aR \sin \alpha}\right) \tag{7}$$

-continued

[Math. 8]
$$D = kd \tag{8}$$

[Math. 9]
$$\theta = 2 \times \tan^{-1}\left(\frac{0.015}{10}\right) \times 60 = 10.3 \ [\text{min}] \tag{9}$$

[Math. 10]
$$\theta = 2 \times \tan^{-1}\left(\frac{0.0135}{10}\right) \times 60 = 9.3 \ [\text{min}] \tag{10}$$

[Math. 11]
$$\theta = 10.3 - 9.3 = 1 \ [\text{min}] \tag{11}$$

The invention claimed is:

1. An encoder apparatus, comprising:
a scale that has an incremental pattern and an absolute pattern and that is provided to a rotation shaft;
a detector that detects the incremental pattern and the absolute pattern;
a rotation information calculator that calculates rotation information on the rotation shaft by using detection results of the detector;
a storage that stores therein eccentricity information between the rotation shaft and the scale; and
a corrector that corrects the rotation information based on the eccentricity information output from the storage and the detection results, wherein
the storage stores therein the eccentricity information on the scale calculated based on a phase difference between a signal corresponding to an incremental detection result obtained when the detector detects the incremental pattern and a signal corresponding to an absolute detection result obtained when the detector detects the absolute pattern.

2. The encoder apparatus according to claim 1 comprising:
an eccentricity information calculator that calculates the eccentricity information by using the incremental detection result and the absolute detection result.

3. The encoder apparatus according to claim 2, wherein the eccentricity information calculator calculates, as the phase difference, a shift amount of peak positions of signals corresponding to detection results of the detector, the shift being caused by eccentricity between the rotation shaft and the scale.

4. The encoder apparatus according to claim 1, wherein distances of the incremental pattern and the absolute pattern from the rotation shaft in a radiation direction with respect to the rotation shaft are different from each other.

5. The encoder apparatus according to claim 4, wherein the absolute pattern is disposed on an inner side of the incremental pattern in the radiation direction with respect to the rotation shaft.

6. The encoder apparatus according to claim 5, wherein
a detection region of the detector includes a plurality of rectangular regions arrayed in a circumferential direction of a circle centered at the rotation shaft,
each of the incremental pattern and the absolute pattern includes a plurality of rectangular figures arrayed in a circumferential direction of a circle centered at the rotation shaft, the signal corresponding to the incremental detection result is a signal corresponding to an average of results of detecting the rectangular figures in the incremental pattern, and the signal corresponding to the absolute detection result is a signal corresponding to a detection result corresponding to one of the rectangular regions in the detection region.

7. The encoder apparatus according to claim 2, wherein the eccentricity information calculator calculates a correction value θ in accordance with the following equation:

$$\theta = \tan^{-1}(d \sin \varphi/R)$$

where d represents a movement amount of the scale from a rotation center of the rotation shaft in a predetermined direction, φ represents an angle formed between a line connecting the rotation center of the rotation shaft and center of the scale and a predetermined straight line passing through the rotation center, and R represents a radius of the scale, and d is determined from the following equation:

$$d = D/k$$

where D represents a phase difference between the signal corresponding to the incremental detection result and the signal corresponding to the absolute detection result, and k represents an eigenvalue determined by an encoder.

8. The encoder apparatus according to claim 1, wherein the rotation information includes a rotation position of the rotation shaft, and the corrector calculates a correction amount of the rotation position based on the eccentricity information.

9. A drive apparatus, comprising:
the encoder apparatus according to claim 1;
a driver that supplies drive power to the rotation shaft; and
a controller that controls the driver by using rotation information corrected by the corrector.

10. A stage apparatus, comprising:
a moving object; and
the drive apparatus according to claim 9 that moves the moving object.

11. A robot apparatus, comprising:
the drive apparatus according to claim 9; and
an arm that moves by the drive apparatus.

12. An encoder apparatus comprising:
a scale that has an incremental pattern and an absolute pattern and that is provided to a rotation shaft;
a detector that detects the incremental pattern and the absolute pattern;
a rotation information calculator that calculates rotation information on the rotation shaft by using detection results of the detector;
an eccentricity information calculator that calculates eccentricity information between the rotation shaft and the scale based on a phase difference between a signal corresponding to an incremental detection result obtained when the detector detects the incremental pattern and a signal corresponding to an absolute detection result obtained when the detector detects the absolute pattern; and
a corrector that corrects the rotation information based on the eccentricity information and the detection results.

13. The encoder apparatus according to claim 12 comprising:

a storage that stores the eccentricity information therein, wherein the corrector corrects the rotation information based on the eccentricity information output from the storage and the detection results.

14. The encoder apparatus according to claim 12, wherein the eccentricity information calculator calculates, as the phase difference, a shift amount of peak positions of signals corresponding to detection results of the detector, the shift being caused by eccentricity between the rotation shaft and the scale.

15. The encoder apparatus according to claim 12, wherein distances of the incremental pattern and the absolute pattern from the rotation shaft in a radiation direction with respect to the rotation shaft are different from each other.

16. The encoder apparatus according to claim 15, wherein the absolute pattern is disposed on an inner side of the incremental pattern in the radiation direction with respect to the rotation shaft.

17. The encoder apparatus according to claim 16, wherein
a detection region of the detector includes a plurality of rectangular regions arrayed in a circumferential direction of a circle centered at the rotation shaft, each of the incremental pattern and the absolute pattern includes a plurality of rectangular figures arrayed in a circumferential direction of a circle centered at the rotation shaft, the signal corresponding to the incremental detection result is a signal corresponding to an average of results of detecting the rectangular figures in the incremental pattern, and the signal corresponding to the absolute detection result is a signal corresponding to a detection result corresponding to one of the rectangular regions in the detection region.

18. The encoder apparatus according to claim 12, wherein the eccentricity information calculator calculates a correction value θ in accordance with the following equation:

$$\theta = \tan^{-1}(d \sin \varphi/R)$$

where d represents a movement amount of the scale from a rotation center of the rotation shaft in a predetermined direction, y represents an angle formed between a line connecting the rotation center of the rotation shaft and center of the scale and a predetermined straight line passing through the rotation center, and R represents a radius of the scale, and d is determined from the following equation:

$$d = D/k$$

where D represents a phase difference between the signal corresponding to the incremental detection result and the signal corresponding to the absolute detection result, and k represents an eigenvalue determined by an encoder.

19. The encoder apparatus according to claim 12, wherein the rotation information includes a rotation position of the rotation shaft, and the corrector calculates a correction amount of the rotation position based on the eccentricity information.

20. A drive apparatus, comprising:
the encoder apparatus according to claim 12;
a driver that supplies drive power to the rotation shaft; and
a controller that controls the driver by using rotation information corrected by the corrector.

21. A stage apparatus, comprising:
a moving object; and
the drive apparatus according to claim 20 that moves the moving object.

22. A robot apparatus, comprising:
the drive apparatus according to claim 20; and
an arm that moves by the drive apparatus.

23. A rotation information acquisition method for acquiring rotation information on a rotation shaft by using an encoder apparatus including: a scale that has an incremental pattern and an absolute pattern and that is provided to the rotation shaft; and a detector that detects the incremental pattern and the absolute pattern, the rotation information acquisition method comprising:
detecting, by the detector, the incremental pattern and the absolute pattern;
calculating rotation information on the rotation shaft by using detection results of the detector;
calculating eccentricity information between the rotation shaft and the scale based on a phase difference between a signal corresponding to an incremental detection result obtained when the detector detects the incremental pattern and a signal corresponding to an absolute detection result obtained when the detector detects the absolute pattern; and
correcting the rotation information based on the eccentricity information and the detection results.

24. A non-transitory storage medium storing therein a rotation information acquisition program for acquiring rotation information on a rotation shaft by using an encoder apparatus including: a scale that has an incremental pattern and an absolute pattern and that is provided to the rotation shaft; and a detector that detects the incremental pattern and the absolute pattern, the rotation information acquisition program causing a computer to execute:
calculating rotation information on the rotation shaft by using detection results obtained when the detector detects the incremental pattern and the absolute pattern;
calculating eccentricity information between the rotation shaft and the scale based on a phase difference between a signal corresponding to an incremental detection result obtained when the detector detects the incremental pattern and a signal corresponding to an absolute detection result obtained when the detector detects the absolute pattern; and
correcting the rotation information based on the eccentricity information and the detection results.

\* \* \* \* \*